United States Patent [19]
Foerster

[11] 3,831,003
[45] Aug. 20, 1974

[54] CIRCUIT ARRANGEMENT FOR THE STEADY TEMPERATURE CONTROL

[75] Inventor: Hans-Joachim Foerster, Taufkirchen, Germany

[73] Assignee: Siemens Aktiengesellschaft, Berlin and Munich, Germany

[22] Filed: Mar. 8, 1973

[21] Appl. No.: 339,096

[30] Foreign Application Priority Data
Mar. 10, 1972  Germany.............................. 2211759
Feb. 5, 1973  Germany............................ 2305510

[52] U.S. Cl................. 219/499, 219/497, 219/501
[51] Int. Cl. ........................................... H05b 1/02
[58] Field of Search ............ 219/494, 499, 497, 501

[56] References Cited
UNITED STATES PATENTS
3,553,429  1/1971  Nelson............................ 219/499 X
3,678,247  7/1972  Sawa................................ 219/499 X
3,733,463  5/1973  Lout.................................. 219/499

Primary Examiner—J. D. Miller
Assistant Examiner—Fred E. Bell
Attorney, Agent, or Firm—Hill, Gross, Simpson, Van Santen, Steadman, Chiara & Simpson

[57] ABSTRACT

A circuit arrangement for effecting a uniform temperature control, utilizing a resistance bridge having a temperature-dependent resistance as a temperature sensor and an operational amplifier in whose output circuit a heating resistance is disposed, the two difference inputs of the operational amplifier being connected in the zero branch of the resistance bridge, and the heating resistance being operatively connected to the output of the operational amplifier by a transistor, circuited for common-emitter operation, the heating resistance being connected to the collector electrode of the transistor, a voltage divider being connected in parallel with the heating resistance, with a part of the resistance of such voltage divider being disposed in a branch of the resistance bridge, and the resistance values of the respective bridge branches or legs, at the normal operating temperature, being substantially equal.

10 Claims, 1 Drawing Figure

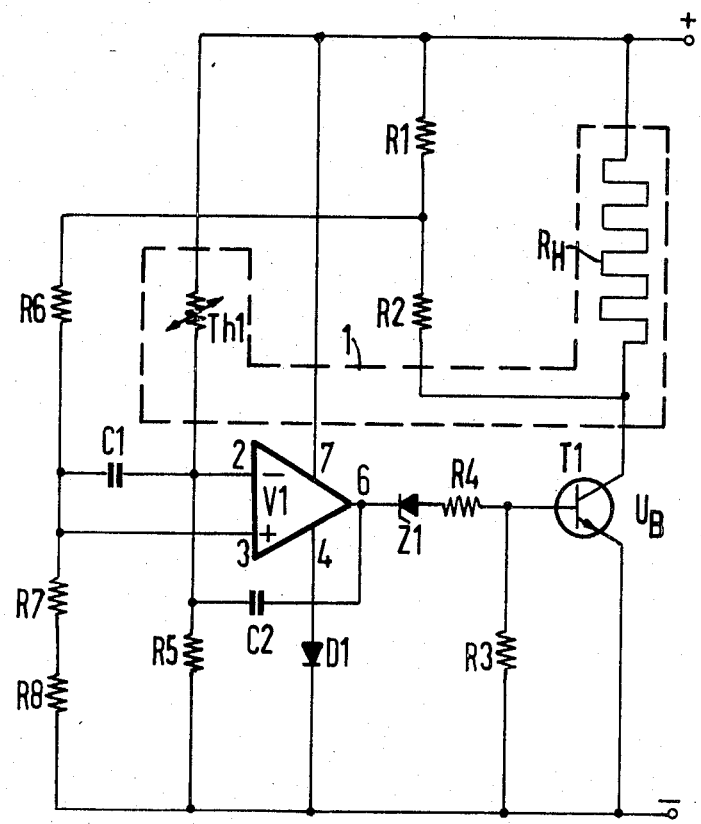

CIRCUIT ARRANGEMENT FOR THE STEADY TEMPERATURE CONTROL

BACKGROUND OF THE INVENTION

The invention is directed to a circuit arrangement for effecting a uniform temperature control, i.e., a "thermostat," employing a resistance bridge having a temperature dependent resistor as a temperature sensor, and a transistor amplifier in whose output circuit a heating resistance is disposed.

Such type of circuit arrangement, or thermostat, is known from the German Offenlegungsschrift 1,957,150. In order to achieve an amplification of the transistor amplifier which is substantially independent of fluctuations in the surrounding temperature, the transistors of the first two stages of the amplifier of such thermostat are disposed in good heat-conducting relationship with the heat jacket or housing of the thermostat. As a result, those transistors providing the greatest portion of the total amplifications of the amplifier, are so disposed that they are unaffected by undefined fluctuations in the surrounding temperature and are thus regulated to a constant temperature.

However, in various applications, this procedure for increasing the reliability of a thermostat cannot be employed. For example, the thermic contacting of the transistor with the heating structure of the thermostat requires additional constructional elements and consequently additional space, which thus is adverse to the miniaturizing of the thermostat. On the other hand, additional energy is required to produce the heat required for the desired temperature regulation. This can create problems, not only with respect to the current supply of the thermostat but also with respect to the dissipation of heat produced in the thermostat.

BRIEF SUMMARY OF THE INVENTION

The invention is directed to the problem of providing a circuit arrangement for a uniform temperature control, utilizing a resistance bridge, a transistor amplifier and a heat resistance disposed in the output circuit of the transistor amplifier, which circuit is relatively very simple and of a space-saving construction, as well as requiring relative little heat energy.

In accordance with the invention, the problem is solved by the utilization of a transistor amplifier in the form of an operational amplifier, constructed in integrated technique, in which the difference inputs thereof are disposed in the zero branch of the resistance bridge, and connecting the output of the amplifier with a heating resistance by a transistor, circuited in emitter mode with the collector electrode for common-emitter operation of the transistor being connected to the heating resistance. A voltage divider is disposed in parallel with the heat resistance, a part of the resistance of such voltage divider also being simultaneously disposed in a branch of the resistance bridge. The resistance values of the components in the individual bridge branches are so selected that they are substantially equal at the normal operating temperature.

As a result of the utilization of an operational amplifier in connection with a resistance bridge having bridge legs or branches which are of like resistance at the normal operating temperature, a highly sensitive temperature control circuit is achieved. The operational amplifier may, for example, comprise an amplifier such as described in Siemens Data Book "Integrated Semiconductor Circuits," 1971/1972 pages 332 to 334. A temperature-dependent resistor, which may be either a NTC-or a PTC-resistor, is employed in the resistance bridge.

The final result is a control circuit which is small as to space requirements, in particular requiring very little structural height, and simultaneously is stable with respect to changes in the supply voltage and surrounding temperature. Due to the low structural height, the temperature control circuit can be utilized on group component carriers having minimum structural height, for example utilizing modular plug-in techniques, etc.

As high amplification is achieved, in the absence of negative feedback, the control amplification is dependent only upon the dimensioning of the voltage divider in the feedback path, i.e., idle amplification in the operational amplifier and current control variations in the transistors do not influence the control circuit.

The circuit arrangement is particularly applicable for oscillator crystals whose oscillation frequencies are in a range between 4MHz through 150MHz. As a result of the utilization of the circuit arrangement, the oscillator crystal may be temperature stabilized to an extent such that a frequency stability of $\Delta f/f$ will result of better than $3 \cdot 10^{-7}$ in an operational temperature range of between $-10°$ C through $+65°$ C.

The circuit arrangement further facilitates a compact construction in that all component parts, including a copper heating jacket or housing slid over the oscillator crystal housing and heated by the heating resistance, may be disposed on a suitable conductor plate. Further, as only the oscillator crystal housing and oscillator crystal, and thus a minimum of space is heated by the heating jacket, only a very small heat loss will result. Consequently, low power requirements are required for the heating means, and heating of the thermostat to normal temperature will be effected in a short period of time. A further reduction in heat loss may, for example, be achieved by appropriate insulation of the space heated by the heating resistance.

The circuit arrangement of the present invention also has the advantage that the surrounding temperature of the amplifying elements is not controlled, resulting in an additional saving in heating energy. However, the amplification of the transistor amplifier remains independent of fluctuations of the surrounding temperature, although it is subject to such fluctuations to a certain extent, as the operational amplifier which supplies the greater part of the total amplification, is already sufficiently stable with respect to surrounding temperature changes, as well as with respect to supply voltage.

In a further development of the invention, the portion of the resistance of the voltage divider, which is disposed in the resistance bridge, is of relatively low resistance as compared with the remaining resistance in the same bridge branch.

As the idle amplification of the controller utilizing the operational amplifier and following transistor stage is very high, a high negative feedback factor can be readily derived from the low resistance portion of the voltage divider disposed in the resistance bridge. Consequently, the effect of amplification variations in the operational amplifier and transistor are negligible with respect to the total amplification. In addition, as such portion of the divider resistance disposed in the resistance bridge is low of resistance with respect to the associated bridge resistance in series therewith and forming the one branch of the bridge, the previously adjusted internal temperature of the thermostat is practically unchanged during a change in the negative feedback coupling factor, and thus of the amplification of the controller.

In a further development of the invention, a Zener diode is connected in series with the output of the operational amplifier, the cathode of the diode being connected to the output of the amplifier and the anode thereof connected, either directly to the base of the following transistor, or over an ohmic resistor.

The Zener voltage of the Zener diode is suitably selected, for example, such that it is approximately at half the operational voltage of the circuit arrangement. As a result of the presence of the Zener diode, the following transistor is substantially prevented from being continuously, highly conductive. The resistance, which may be additionally inserted between the Zener diode and the base of the transistor, is operable to impose a limitation on the output current of the operational amplifier. The use of a construction, such as that above described, in a thermostat results in the achievement, in an advantageous manner, of the continuous control of the voltage of the heating resistance, together with the feedback to the input of the circuit arrangement of a magnitude proportional to the instantaneous heating power involved. As a result, amplification variations in the operational amplifier and the following transistor are levelled out in the presence of a uniform control function, in a very simple manner. Such amplification variations are usually due to tolerances which must be accented consistent with economic production.

Further, there must be taken into account the additional fact that like amplifier types may be produced by different manufacturers, whereby a fairly large tolerance range must be expected and taken into account. However, if the productional tolerances of the operational amplifier or the following transistor exceed predetermined values, and in particular, with respect to products whose amplification range is below the admitted tolerance limit, the danger exists, even with a circuit arrangement described, that undesired high frequency stray-effects are also amplified, which impair the control action. For example, such stray-effects may be due to oscillator crystals or oscillator circuits whose surrounding temperature is controlled by the present temperature control circuit in order to obtain a desired frequency constancy.

In a further development of the invention, for the solution of the problems referred to, a first capacitor is connected in the zero branch or diagonal of the resistor bridge, which is so dimensioned, as to its capacitance value, that undesired high frequency stray-effects are, to a great extent, weakened in amplitude, and a second capacitor is connected between the output of the difference amplifier and its inverted input, with the capacitance value of the second capacitor being so selected that the previously weakened high frequency stray-effects reaching the amplifier input remain unamplified.

As a result of these measures, there advantageously results that the total amplification of the control loop is less than one for the frequency range in which undesired high frequency stray-effects are expected. Consequently, an adverse influence thereof on the control action of the circuit arrangement is completely prevented. More specifically, influence thereof on the heat energy emitted by the heating resistor is prevented. This is also true in the given circuit arrangement when operational amplifiers are employed therewith whose extent of amplification extends over an extremely wide tolerance range, and even in such cases, the capacitive feedback coupling of the operational amplifier will assure that its limit frequency is greatly lowered, whereby no amplification of the high frequency fluctuations will be effected. As a result, large tolerances are acceptable for the active components which are employed, particularly in the operational amplifier. Such components therefore can be produced especially economically in mass production. In addition, no special selection must be made with respect to the operational amplifier when the involved circuit arrangement is manufactured, as each amplifier of one and the same type can be utilized with equal success.

Furthermore, according to a further development of the invention, the first and second capacitors referred to are so selected that they are of equal value, with their capacity value amounting respectively to approximately 1 $nF$. In addition to the advantage of a small constructional height of the respective capacitors, the further advantage is derived that in production, only one particular type of capacitor is involved.

BRIEF DESCRIPTION OF THE DRAWINGS

The FIGURE of the drawing illustrates a circuit arrangement embodying the present invention.

DETAILED DESCRIPTION OF THE INVENTION

Referring to the drawing, the circuit arrangement therein illustrated is adapted for continuous temperature control, for example, in maintaining a constant surrounding temperature of an oscillator crystal (not illustrated in the drawing). The circuit is supplied by the operational voltage $UB$ and employs a temperature-dependent resistor in a form of a NTC-resistor Th1, as a temperature sensor, which is in good thermic contact with the heat jacket or housing of the oscillator crystal. The thermic coupling is indicated in the drawing by the dotted line 1. The bridges formed by resistors R1, R5, R6, R7, R8 and the temperature-dependent resistor Th1, with the resistors R5 and R6 each forming one of a pair of opposite branches or legs of the bridge, the resistors R7 and R8 comprising a third branch and the resistor R1 and temperature dependent resistor Th1 forming the last branch. The voltage UB is operatively applied across the diagonal from the junction of the resistors R1 and R6, and the junction of the resistors 5 and 8, with the inputs 2 and 3 of the operational amplifier V1 being connected across the zero diagonal of the bridge, the input 2 of the amplifier being connected to the junction of the resistor R5 and temperature-dependent resistor Th1 and the input 3 being connected to the juncture of resistors R6 and R7. The operational amplifier V1 is provided with internal frequency compensation and in order to optimize offset voltage and thermic drift thereof, the bridge is so dimensioned that the respective branches or legs thereof have approximately equal resistance values at the nominal temperature of the thermostat.

A first capacitor C1 is inserted in the zero branch of the resistance bridge and thus shunting the inputs 2 and 3 of the amplifier, which capacitor has a capacitance value such that undesired high frequency stray-effects are to a great extent weakened in amplitude. In a practical embodiment of the invention, the capacitance of such capacitor is, for example, 1nF, which value assures that the high frequency stray-effects which many emanate, for example, from an oscillator crystal, can appear only to a very minor extent at the inputs 2 and 3 of the operational amplifier V1. In addition, a capacitor C2 is shunted between the output 6 of the differential amplifier and its inverted input 2. The capacitance value of such second capacitor is likewise so selected that the previously weakened high frequency stray-effects, which still reach the amplifier input are not additionally amplified. In the embodiment illustrated, the second capacitor C2 has, for example, a capacitance value of approximately 1nF. As a result of the inclusion of the two capacitors C1 and C2, the total amplification of the control circuit in the frequency range of the high frequency stray-effects is less than one, even in the case of extreme amplification variations at the operational amplifier V1. In view thereof, such variations, which may negatively influence the control action of the circuit arrangement, are excluded.

In addition, a diode D1 is provided, which eliminates the possible destruction of the operational amplifier in the event the polarity of the applied voltage Uwas inadvertently reversed. The output signal of the amplifier V1, available at terminal 6, controls the transistor T1 over the Zener diode Z1 and resistor R4, with the heating resistor $R_H$ being disposed in the transistor collector circuit, the cathode of the Zener Diode Z1 being connected to the output 6 of the operational amplifier, and the anode thereof being connected to operational voltage over a resistor R3 and a series resistor R4. The resistor R4 limits the output current of the operational amplifier V1, and the Zener diode prevents the transistor T1 from being continuously highly conductive.

The Zener voltage of the Zener diode Z1 is so selected, for the optimum operation of the amplifier V1, that the mean output voltage of the amplifier at terminal 6 is approximately half the operational voltage $U_B$, i.e., $U_B/2$, with respect to one of the terminals of the operational voltage UB and correspondingly plus or minus. The negative feedback voltage is derived from the voltage divider comprising resistors R1 and R2 which are connected in parallel with the heating resistor $R_H$. With the resistor R1 having a low resistance as compared with the resistor R6 the negative feedback factor K of the controlled circuit amounts to practically 500, with the effect of amplification variations in the amplifier V1 and the transistor T1 on the total amplification of the circuit being negligible. As the resistance tolerances of the bridge resistors R5 and R6 amount to ± 5 percent, and those of the temperature-dependent resistance Th1 may amount to as much as ± 20 percent, a tolerance or equalization must be effected with the assistance of the bridge branch formed by the resistors R7 and R8 for adjusting the thermostat temperature. The power which is still possible in the circuit when the transistor T1 is blocked, is so small that it will heat the thermostat to approximately 2° C., i.e., the upper limit of the operational temperature range is closely under the internal temperature.

In order to provide operation with as little heating power as possible, the heated surface, and also the heat dissipation must be kept low. The smaller heating surface is achieved when the heating resistance or winding is applied directly to the quartz crystal. This method, however, has the disadvantage, among others, that a change or replacement of crystals and thus a change in frequency is not readily possible. In view thereof, a thin copper heating jacket or cover is provided which will closely surround the cap of the oscillator crystal. The heat resistance $R_H$ is for example, a wire resistance, with the resistance wire being wound about a copper heating jacket or housing. As a result, an extremely small heat dissipation of only approximately 12mW/° C will be achieved. The oscillator crystal thus becomes a component of the controlled circuit, as a result of the application of the heat resistance $R_H$ on the copper jacket which, in turn, is in good heat contact with the oscillator crystal housing.

The thermostat therefore fulfills the desired control function only when the component part, which must be stabilized as to its temperature, is inserted in the crystal mounting. The internal temperature changes, within the operational temperature range, which can be obtained with the described thermostat, amount to only ± 0.5° C, with respect to the mean operational temperature range. As the change in any bridge output voltage is very small in the presence of fluctuations of the operational voltage $U_B$, due to the utilization of bridge resistances having equal resistance values at the nominal temperature, a voltage stabilization of the resistor bridge is superfluous. Operational voltage changes of $\Delta U_B/U_B = \pm 5$ percent will cause an internal temperature change of merely 0.05° C.

Although particular embodiments of the invention have been described and illustrated herein, it is recognized that modifications and variations may readily occur to those skilled in the art and consequently it is intended that the claims be interpreted to cover such modifications and equivalents.

I claim as my invention:

1. In a circuit arrangement for effecting a uniform temperature control, utilizing a resistance bridge having a temperature-dependent resistance as a temperature sensor, and a transistor amplifier in whose output circuit a heating resistance is disposed, the combination of a resistance bridge, a transistor amplifier in the form of an operational amplifier constructed in integrated technique, the two difference inputs of which are connected in the zero branch of the resistance bridge, a transistor operatively connected to the output of the operational amplifier for common-emitter operation, a heat resistance connected to the oscillator electrode of the transistor, and a voltage divider connected in parallel with the heat resistance, a part of the resistance of the voltage divider being disposed in a branch of the resistance bridge, the resistance values of the respective bridge branches, at the normal operative temperature, being substantially equal.

2. A circuit arrangement according to claim 1, wherein the value of the portion of the resistance, of the voltage divider which forms a part of the resistance bridge, is small as compared with the remaining resistance in series therewith forming the associated bridge branch.

3. A circuit arrangement according to claim 1, comprising in further combination, a Zener diode, the cathode of which is connected to the output of the operational amplifier and the anode of which is operatively connected to the base of the transistor.

4. A circuit arrangement according to claim 3, wherein said diode anode is connected to the transistor base over a resistance.

5. A circuit arrangement according to claim 1, comprising in further combination, a first capacitor connected in the zero branch of the resistance bridge, having a capacitance value such that undesired high-frequency stray-effects are substantially weakened, and a second capacitor, connecting the output of the differential amplifier with its inverted input, having a capacitance value such that the previously weakened high-frequency stray-effects reaching the amplifier input will receive no material amplification.

6. A circuit arrangement according to claim 5, wherein said first and second capacitors have equal capacity values of approximately 1nF.

7. A circuit arrangement according to claim 2, comprising in further combination, a first capacitor connected in the zero branch of the resistance bridge, having a capacitance value such that undesired high-frequency are substantially weakened, and a second capacitor, connecting the output of the differential amplifier with its inverted input, having a capacitance value such that the previously weakened high-frequency reaching the amplifier intput will receive no material amplification.

8. A circuit arrangement according to claim 7, comprising in further combination, a Zener diode, the cathode of which is connected to the output of the operational amplifier and the anode of which is operatively connected to the base of the transistor.

9. A circuit arrangement according to claim 8, wherein said diode anode is connected to the transistor base over a resistance.

10. A circuit arrangement according to claim 9, wherein said first and second capacitors have equal capacity values of approximately 1nF.

* * * * *